(12) United States Patent
Eriksson

(10) Patent No.: US 8,321,168 B2
(45) Date of Patent: Nov. 27, 2012

(54) METHOD FOR COMPENSATING DRIFT IN A POSITION MEASURING DEVICE

(75) Inventor: Sven-Ake Eriksson, Siljansnas (SE)

(73) Assignee: C2SAT Communications AB, Solna (SE)

( * ) Notice: Subject to any disclaimer, the term of this patent is extended or adjusted under 35 U.S.C. 154(b) by 596 days.

(21) Appl. No.: 12/521,900

(22) PCT Filed: Dec. 14, 2007

(86) PCT No.: PCT/SE2007/051006
§ 371 (c)(1),
(2), (4) Date: Jul. 1, 2009

(87) PCT Pub. No.: WO2008/085100
PCT Pub. Date: Jul. 17, 2008

(65) Prior Publication Data
US 2010/0042349 A1 Feb. 18, 2010

(30) Foreign Application Priority Data
Jan. 9, 2007 (SE) ...................................... 0700029

(51) Int. Cl.
*G01C 17/38* (2006.01)
(52) U.S. Cl. ....................................................... 702/94
(58) Field of Classification Search .................. 702/85, 702/90, 93–96, 105, 141, 142, 145, 148, 702/150–153
See application file for complete search history.

(56) References Cited

U.S. PATENT DOCUMENTS
3,258,977 A 7/1966 Hoffman
4,321,678 A * 3/1982 Krogmann ..................... 701/220
2004/0199300 A1* 10/2004 Gustafsson et al. .............. 701/1

OTHER PUBLICATIONS

Sumiko Majima et al., "A Controller for Changing the Yaw Direction of and Underactuated Unicycle Robot", 5th International Conferenceon Technology and Automation (ICTA05), Oct. 15, 2005, retrieved from: http://icta05.teithe.gr/index.php, http://iclap05.leithe.gr/papers/27.pdf, section IV A, IV B, pp. 1-6.
International Search Report dated May 9, 2008, from corresponding PCT application.

* cited by examiner

*Primary Examiner* — Mohamed Charioui
(74) *Attorney, Agent, or Firm* — Young & Thompson

(57) ABSTRACT

A method for compensating the drift of an element for position measurement mounted on an object, including at least one gyro for measuring rotation of the object about an axis and at least one accelerometer for measuring two mutually perpendicular components of the acceleration of gravity as a consequence of the orientation of the object relative to the acceleration of gravity along two mutually perpendicular directions, which together correspond to the rotation of the object about the axis. The output signal from the accelerometer and the output signal from the gyro are low-pass filtered. These two signals are compared and the output signal from the gyro is compensated using an output signal from the accelerometer so that the deviation of the output signal of the gyro because of drift is decreased or eliminated. The thus produced, compensated signal constitutes an output signal from the gyro.

11 Claims, 1 Drawing Sheet

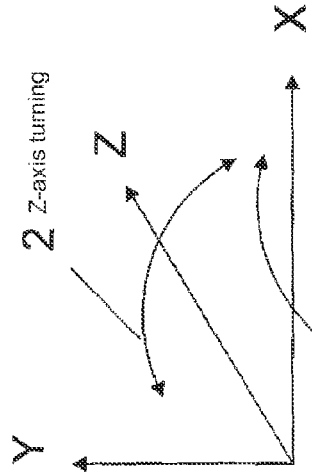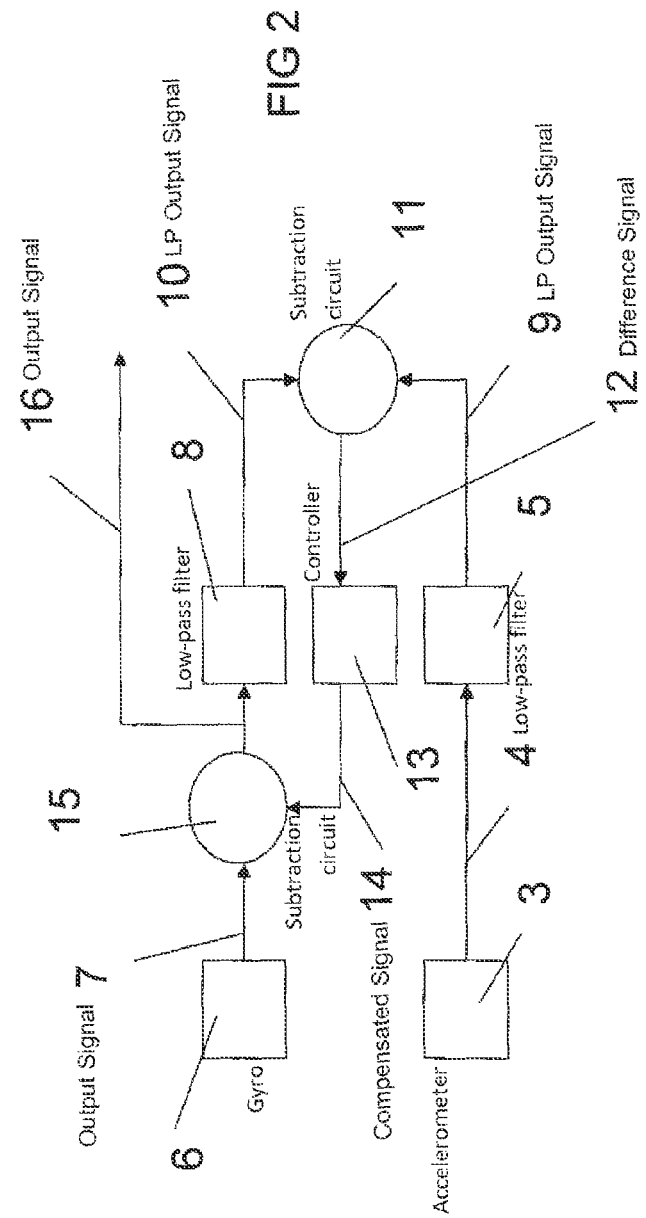

METHOD FOR COMPENSATING DRIFT IN A POSITION MEASURING DEVICE

BACKGROUND OF THE INVENTION

1. Field of the Invention

The present invention relates to a method for compensating the drift of a means for position measurement.

2. Description of Related Art

When positioning for example satellite antennas on moving objects, such as ships, various axes and angles are measured by the use of gyros and accelerometers in order to be able to direct a satellite antenna, using signals from such sensors, so that it is directed towards a desired satellite at all times, in spite of the ship moving in the water.

In the present example, a gyro module comprises three orthogonally mounted, fibre optic gyros and a triaxial accelerometer. Thus, such a unit yields information on rotation about three axes and linear changes in motion in three directions.

The gyros yield good quality information on dynamic rotational movements, but are associated with the disadvantage of drifting and thereby generate false rotational movement information.

BRIEF SUMMARY OF THE INVENTION

The present invention solves this above-described problem.

Thus, the present invention relates to a method for compensating the drift of a means for position measurement which is mounted on an object, such as a ship or another vehicle, comprising at least one gyro for measuring rotation of the object about an axis and at least one accelerometer for measuring two mutually perpendicular components of the acceleration of gravity as a consequence of the orientation of the object relative to the acceleration of gravity along two mutually perpendicular directions, which together correspond to the rotation of the object about said axis, and is characterized in that the output signal from the accelerometer is low-pass filtered, in that the output signal from the gyro is low-pass filtered, in that these two signals are compared and the output signal from the gyro is compensated using an output signal from the accelerometer so that the deviation of the output signal of the gyro because of drift is decreased or eliminated, and in that the thus produced, compensated signal constitutes an output signal of the gyro.

BRIEF DESCRIPTION OF THE SEVERAL VIEWS OF THE DRAWINGS

Below, the invention is described in closer detail, partly in connection to an embodiment as illustrated in the appended drawing, where FIG. 1 shows a coordinate system; and FIG. 2 shows a block diagram of a compensating device for one dimension, that is for one gyro.

DETAILED DESCRIPTION OF THE INVENTION

In FIG. 1, a coordinate system is shown, which is assigned to a vehicle. Below, the vehicle is exemplified with a ship. In FIG. 1, the Y axis points perpendicularly upwards from the ship, the X axis along the longitudinal axis of the ship in the forward direction and the Z axis across the longitudinal axis of the ship. When the ship rolls sideways, the ship turns about the X axis, as shown by the arrows 1. When the ship pitches, the ship turns about the Z axis, as shown by the arrows 2.

A gyro measures the rotation about the X axis, one gyro about the Y axis and one gyro about the Z axis.

An accelerometer measures linear motion along the X-, Y- and Z axes.

For example, during rolling, only rotation about the X axis will be measured by a gyro. The accelerometer measures the corresponding motion using its sensors in the directions of the Y- and Z axes, respectively. Thus, redundant information is present in the system regarding rolling motion.

An accelerometer is ill-suited for measuring quick changes, but is well suited for measuring static measurement values.

Examples of suitable gyros are those being sold under the trade name KVH DSP-3000 by the company KVH Industries, Inc. One example of a suitable accelerometer is one sold by STMicroelectronics in Geneva, Switzerland.

Thus, the present invention relates to a method for compensating the drift of a means for position measurement which is mounted on an object, such as a ship or another vehicle, comprising at least one gyro for measuring the rotation of the object about an axis and at least one accelerometer for measuring two mutually perpendicular components of the acceleration of gravity as a consequence of the orientation of the object relative to the acceleration of gravity along two mutually perpendicular directions that together correspond to the rotation of the object about said axis.

According to the invention, the output signal 4 from the accelerometer 3 is low-pass filtered in a low-pass filter 5. By low-pass filtering the rolling value of the accelerometer, a signal is obtained which corresponds to the equilibrium point about which the ship rolls. The output signal 7 from the gyro 6 is also low-pass filtered in a low-pass filter 8. By low-pass filtering the gyro data, rolling values are obtained that slowly drift as a consequence of the drift of the gyro.

According to the invention, the two low-pass filtered signals are compared, and the output signal from the gyro is compensated using the output signal from the accelerometer, so that the deviation of the output signal of the gyro because of drift is decreased or eliminated. The signal thus established constitutes an output signal from the gyro.

According to a preferred embodiment, the signals 9, 10 are subtracted after the respective low-pass filtering in a subtraction circuit 11 of a known type, whereby a difference is obtained. This difference passes a suitable, known controller 13. Among other things, the controller controls the size of the compensating factor. The difference 14 after the controller 13 is subtracted from the output signal 7 from the gyro 6 in another suitable, known subtraction circuit 15. The difference thus established constitutes an output signal 16 from the gyro 6, in which the drift of the gyro has been compensated.

Hence, the present method solves the initially mentioned problem.

The circuit described in FIG. 2 may be designed with discrete components, but according to a preferred embodiment of the invention the said low-pass filtrations and said subtractions are carried out in digital format in a processor, in other words as a digital signal processing.

It is apparent that in case several gyros are present in the said means for position measurement, the said compensation is carried out separately for each individual gyro, using two mutually linear motions of the accelerometer which describes the rotation of the current gyro which is to be compensated.

According to a preferred embodiment, output signals from two or several accelerometers 3 are processed so as to compensate two or several gyros 6. To this end, the position or motion of the object in two or three dimensions is described using the output signals from the accelerometers, after which each respective gyro is compensated.

In the case with a ship, the gyro measuring rotation about the Y axis may not be compensated according to the present method, compensation of that gyro is carried out using the gyro compass of the ship.

Above, the invention has been exemplified with a means for position measurement of the motions of a ship.

However, the invention is also applicable to vehicles moving along the surface of the ground, for example vehicles carrying a satellite antenna whose direction in relation to the vehicle must be altered continuously as the position of the vehicle is altered when moving along the surface of the ground. Furthermore, the invention is applicable on floating vehicles of various types.

The invention claimed is:

1. A method for compensating the drift of a means for position measurement which is mounted on an object, the method comprising:
   with at least one gyro (6), measuring rotation of the object about an axis;
   with at least one triaxial accelerometer (3) arranged to measure acceleration of the object in one point along three different directions, measuring the acceleration of the object in the one point along the three different directions;
   low-pass filtering of an output signal (7) from the gyro (6) so that a low-pass filtered gyro signal is achieved;
   low-pass filtering of an output signal (4) from the accelerometer (3) so that a low-pass filtered accelerometer signal is achieved, the low-pass filtered accelerometer signal corresponding to an equilibrium position about which the object moves;
   subtracting the low-pass filtered gyro signal and the low-pass filtered accelerometer signal from each other, whereby a difference signal (12) is established;
   compensating the difference signal (12) by passing the difference signal (12) through a controller (13) which controls a size of a compensation factor whereby a compensated signal (14) is established at an output of the controller (13); and
   subtracting the compensated signal (14) output from the controller (13) from the output signal (7) from the gyro (6) to establish a drift-compensated gyro output signal.

2. The method according to claim 1, wherein said steps of low-pass filtering and subtracting are carried out in digital format in a processor.

3. The method according to claim 1, wherein said compensating step is carried out separately for each individual gyro (6).

4. The method according to claim 1, wherein the output signals from plural accelerometers (3) are processed in order to compensate plural gyros (6).

5. The method according to claim 1, wherein the object is a ship and the method is performed on the ship.

6. A method for compensating the drift of a device for position measurement which is mounted on a ship, the method comprising:
   measuring rotation of the object about an X axis, a Y axis, and a Z axis using at least one gyro (6) mounted on the ship where i) the Y axis points perpendicularly upwards from the ship, the X axis points along a longitudinal axis of the ship in a forward direction, and the Z axis points across the longitudinal axis of the ship, ii) when the ship rolls sideways, the ship turns about the X axis, and iii) when the ship pitches, the ship turns about the Z axis;
   low-pass filtering of an output signal (7) from the gyro (6) so that a low-pass filtered gyro signal is achieved, the low-pass filtered gyro signal comprising rolling values of the ship, the rolling values drifting as a consequence of drift of the gyro;
   with a triaxial accelerometer (3), measuring acceleration of linear motion of the ship in one point along three different directions corresponding to the X axis, the Y axis, and the Z axis;
   low-pass filtering of an output signal (4) from the accelerometer (3) so that a low-pass filtered accelerometer signal is achieved, the low-pass filtered accelerometer signal corresponding to an equilibrium position about which the ship moves;
   subtracting the low-pass filtered gyro signal and the low-pass filtered accelerometer signal from each other to establish a difference signal (12);
   compensating the difference signal (12) by passing the difference signal (12) through a controller (13) which controls a size of a compensation factor whereby a compensated signal (14) is established at an output of the controller (13); and
   subtracting the compensated signal (14) output from the controller (13) from the output signal (7) from the gyro (6) to establish a drift-compensated gyro output signal.

7. The method of claim 6, wherein, during rolling of the ship, the method comprises the further steps of using the accelerometer to measure motion in the directions of the Y axis and the Z axis as redundant information regarding rolling motion.

8. The method according to claim 6, wherein said steps of low-pass filtering and subtracting are carried out in digital format in a processor.

9. The method according to claim 6, wherein,
   plural of said triaxial accelerometer (3) measure the acceleration of the ship, and
   output signals from the plural accelerometers (3) are processed in order to compensate plural gyros (6).

10. A method for compensating the drift of a device for position measurement which is mounted on a vehicle moving along a ground surface, the method comprising:
    measuring rotation of the object about an X axis, a Y axis, and a Z axis using at least one gyro (6) mounted on the vehicle where the Y axis points perpendicularly upwards from the vehicle, the X axis points along a longitudinal axis of the vehicle in a forward direction, and the Z axis points across the longitudinal axis of the vehicle;
    low-pass filtering of an output signal (7) from the gyro (6) so that a low-pass filtered gyro signal is achieved, the low-pass filtered gyro signal comprising values drifting as a consequence of drift of the gyro;
    with a triaxial accelerometer (3), measuring acceleration of linear motion of the vehicle in one point along three different directions corresponding to the X axis, the Y axis, and the Z axis;
    low-pass filtering of an output signal (4) from the accelerometer (3) so that a low-pass filtered accelerometer signal is achieved, the low-pass filtered accelerometer signal corresponding to an equilibrium position about which the vehicle moves;
    subtracting the low-pass filtered gyro signal and the low-pass filtered accelerometer signal from each other to establish a difference signal (12);
    compensating the difference signal (12) by passing the difference signal (12) through a controller (13) which controls a size of a compensation factor so that a compensated signal (14) is established at an output of the controller (13); and subtracting the compensated signal (14) output from the controller (13) from the output signal (7) from the gyro (6) to establish a drift-compensated gyro output signal.

11. The method according to claim 10, wherein said steps of low-pass filtering and subtracting are carried out in digital format in a processor.

\* \* \* \* \*